Patented July 8, 1930

1,770,165

UNITED STATES PATENT OFFICE

GEORGES PATART, OF PARIS, FRANCE, ASSIGNOR TO DU PONT AMMONIA CORPORATION, OF WILMINGTON, DELAWARE, A CORPORATION OF DELAWARE

METHOD FOR THE PRODUCTION OF ORGANIC COMPOUNDS CONTAINING OXYGEN

No Drawing. Application filed January 29, 1926, Serial No. 84,771, and in France February 7, 1925.

It is a known fact that in the catalytic reduction of carbon monoxide by the action of catalyzers such as a mixture of zinc oxide with potassium oxide, or copper oxide or copper, and under high pressures, varying from 100 to 500 atmospheres, there may be obtained, in addition to methyl alcohol, a certain quantity of higher alcohols, chiefly when the contact between the gas mixture and the catalyzer lasts for a sufficiently long time. But as a rule the proportion of higher alcohols thus obtained is much smaller than the amount of methyl alcohol which is formed at the same time.

But in certain cases it may be desired to transform the major part or even the whole of the gas mixture into alcohols of a high molecular weight or even into a given alcohol having the maximum obtainable molecular weight.

It has been found, according to the present invention, that the reaction may be directed towards the formation preferably of an alcohol having a greater molecular weight than methyl alcohol.

The method according to the invention consists essentially in separating, from the condensed products resulting from the above mentioned catalytic reduction under pressure, the methyl alcohol as well as the other products whose molecular weight is below that of the alcohol sought for, and in subjecting these separated products to a further catalytic action either by again introducing them in the state of vapour into the gas mixture under reaction or into a different gaseous mixture or by circulating them over another catalytic mass in a special reaction chamber containing the same catalyzer or any other catalyzer which may be more suitable for the purpose.

To obviate all condensation, or even all variations in temperature, which would disturb the reaction, care must be taken to preliminarily heat the liquid to be introduced so as to bring it to the temperature of the reaction chamber, which will as a rule be above the critical temperature of the liquid to be again introduced, so that no condensation will take place.

For this purpose, the liquid may be forced —preferably in a continuous manner—into a closed chamber which is heated to a point slightly above its critical temperature, and from which, after vaporization, it will be supplied into the said reaction chamber at a suitable point. The supply of the liquid will be regulated according to the composition of the collected products.

Having now described my invention, what I claim as new and desire to secure by Letters Patent is:

1. Method for the synthetic production of higher molecular organic compounds containing oxygen which consists in reducing carbon monoxide by hydrogen in the presence of a catalyzer and under an elevated temperature and pressure, condensing the products thereby obtained, separating from the condensates the compounds having a lighter molecular weight than the higher compounds to be produced and subjecting the compounds thus separated again to a catalytic reduction under a high pressure under a temperature high enough to maintain said compounds in the vapor phase.

2. Method for the synthetic production of higher molecular organic compounds containing oxygen which consists in reducing carbon monoxide by hydrogen in the presence of a catalyzer and under an elevated temperature and pressure, condensing the products thereby obtained, separating from the condensates the compounds having a lighter molecular weight than the higher compounds to be produced and re-introducing the compounds thus separated into the initial mixture of carbon monoxide and hydrogen and catalytically reducing, under an elevated pressure, the mixture thus formed.

3. Method for the synthetic production of higher molecular organic compounds containing oxygen which consists in reducing carbon monoxide by hydrogen in the presence of a catalyzer and under an elevated temperature and pressure, condensing the products thereby obtained, separating from the condensates the compounds having a lighter molecular weight than the higher compounds to be produced, vaporizing the said separated compounds, mixing the vapors thus produced with a gaseous mixture containing carbon monoxide and subjecting the mixture thus obtained again to a catalytic reduction under an elevated temperature and pressure.

4. Method for the synthetic production of higher molecular organic compounds containing oxygen which consists in reducing carbon monoxide by hydrogen in the presence of a catalyzer and under an elevated temperature and pressure, condensing the products thereby obtained, separating from the condensates the compounds having a lighter molecular weight than the higher compounds to be produced, vaporizing the said separated compounds, mixing the vapors thus produced with a gaseous mixture containing carbon monoxide and hydrogen and subjecting the mixture thus obtained again to a catalytic reduction under an elevated temperature and pressure.

5. Method for the synthetic production of higher molecular organic compounds containing oxygen which consists in reducing carbon monoxide by hydrogen in the presence of a catalyzer and under an elevated temperature and pressure, condensing the products thereby obtained, separating from the condensates the compounds having a lighter molecular weight than the higher compounds to be produced, vaporizing the said separated compounds and heating the vapors thus produced up to a temperature above the critical temperature of the mixture formed by them and subjecting the said vapors while above said temperature to a catalytic reduction under a high pressure.

6. The process of producing higher molecular organic compounds containing oxygen which consists in exposing a gas containing carbon monoxide and a vaporized aliphatic alcohol to the action of a catalyst at an elevated temperature and pressure.

7. The process of producing higher molecular organic compounds containing oxygen which consists in catalyzing a gas containing carbon monoxide and hydrogen with a vaporized aliphatic alcohol at an elevated temperature and pressure.

In testimony whereof I have signed my name to this specification.

GEORGES PATART.